US011989192B2

(12) United States Patent
Gupta et al.

(10) Patent No.: US 11,989,192 B2
(45) Date of Patent: May 21, 2024

(54) FEDERATED SEARCH SYSTEM

(71) Applicant: Uber Technologies, Inc., San Francisco, CA (US)

(72) Inventors: Kapil Gupta, Sunnyvale, CA (US); Mengdie Wang, Sunnyvale, CA (US); Sivaramakrishnan Natarajan, San Jose, CA (US); Houtan Shirani-Mehr, Sunnyvale, CA (US); Haonan Duan, Toronto (CA); Tao Jing, Sunnyvale, CA (US); Jesse Chou, San Jose, CA (US)

(73) Assignee: Uber Technologies, Inc., San Francisco, CA (US)

( * ) Notice: Subject to any disclaimer, the term of this patent is extended or adjusted under 35 U.S.C. 154(b) by 39 days.

(21) Appl. No.: 17/659,122

(22) Filed: Apr. 13, 2022

(65) Prior Publication Data

US 2023/0334053 A1 Oct. 19, 2023

(51) Int. Cl.
*G06F 16/00* (2019.01)
*G06F 16/2457* (2019.01)
*G06F 16/248* (2019.01)
*G06F 16/25* (2019.01)
*G06F 16/28* (2019.01)

(52) U.S. Cl.
CPC ...... *G06F 16/24578* (2019.01); *G06F 16/248* (2019.01); *G06F 16/256* (2019.01); *G06F 16/285* (2019.01)

(58) Field of Classification Search
None
See application file for complete search history.

(56) References Cited

U.S. PATENT DOCUMENTS 10,152,541 B2* 12/2018 Barve ............... G06F 16/9535
11,106,751 B1* 8/2021 Kadayam .......... G06Q 30/0222

OTHER PUBLICATIONS

"Borda count", [Online]. Retrieved from the Internet: <URL: https://en.wikipedia.org/wiki/Borda_count#As_a_consensual_method>, (accessed Jan. 16, 2024), 11 pgs.
Aslam, Javed A., et al., "Models for metasearch", Proceedings of the 24th annual international ACM SIGIR conference on Research and development in information retrieval, (2001), 9 pgs.
Dwork, Cynthia, et al., "Rank aggregation methods for the web", Proceedings of the 10th international conference on World Wide Web, (2001), 613-622.

(Continued)

*Primary Examiner* — Thu Nguyet T Le
(74) *Attorney, Agent, or Firm* — SCHWEGMAN LUNDBERG & WOESSNER, P.A.

(57) ABSTRACT

Systems and methods herein describe a network system for federated searching. The systems and methods receive a search query, transmit the search query to search providers, receive search results corresponding to the search query, extract metadata from each search result, generate matched groupings comprising a first search results that have matching metadata, generate a ranked list of the matched groupings and a plurality of relevance scores, identify a second subset of search results based on the ranked list of matched groupings, and cause display of the second subset of search results on a graphical user interface of a computing device.

20 Claims, 5 Drawing Sheets

(56) References Cited

OTHER PUBLICATIONS

Fagin, Ronald, et al., "Efficient similarity search and classification via rank aggregation", Proceedings of the 2003 ACM SIGMOD international conference on Management of data, (2003), 12 pgs.

Lin, Zhiwei, et al., "Consensus measure of rankings", arXiv preprint arXiv:1704.08464, (2017), 11 pgs.

Schalekamp, Frans, et al., "Rank aggregation: Together we're strong", 2009 Proceedings of the Eleventh Workshop on Algorithm Engineering and Experiments (ALENEX). Society for Industrial and Applied Mathematics, (2009), 38-51.

* cited by examiner

FEDERATED SEARCH SYSTEM

TECHNICAL FIELD

Embodiments herein generally relate to search protocols. More specifically, but not by way of limitation, embodiments herein describe a federated search system.

BACKGROUND

Selecting a proper search protocol is essential for providing accurate search results to a search query. The proper search protocol may be dependent on various factors including aspects of the search query.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A federated search protocol indexes multiple data sources, simultaneously and presents the results to users in a unified interface. Systems and methods herein describe a network system that uses a federated search protocol for providing search results to a search query.

In one embodiment, the system receives a search query and classifies the search query based on aspects of the query. Based on the classification of the query, the system identifies search providers (and corresponding data sources) that best match the classification of the query. After identifying the search providers, the system transmits the query to the search providers and receives a list of search results. The system extracts features from the search results and generates clusters of search results based on matching extracted features. The generated clusters are ranked according to optimization criteria and each ranked cluster is provided with a relevance score. The system identifies individual search results within each ranked cluster based on the relevance score and other aspects of the search results. The individual search results are displayed on a computing device within a unified graphical user interface. Further details of the network system are described below.

Figure 1:
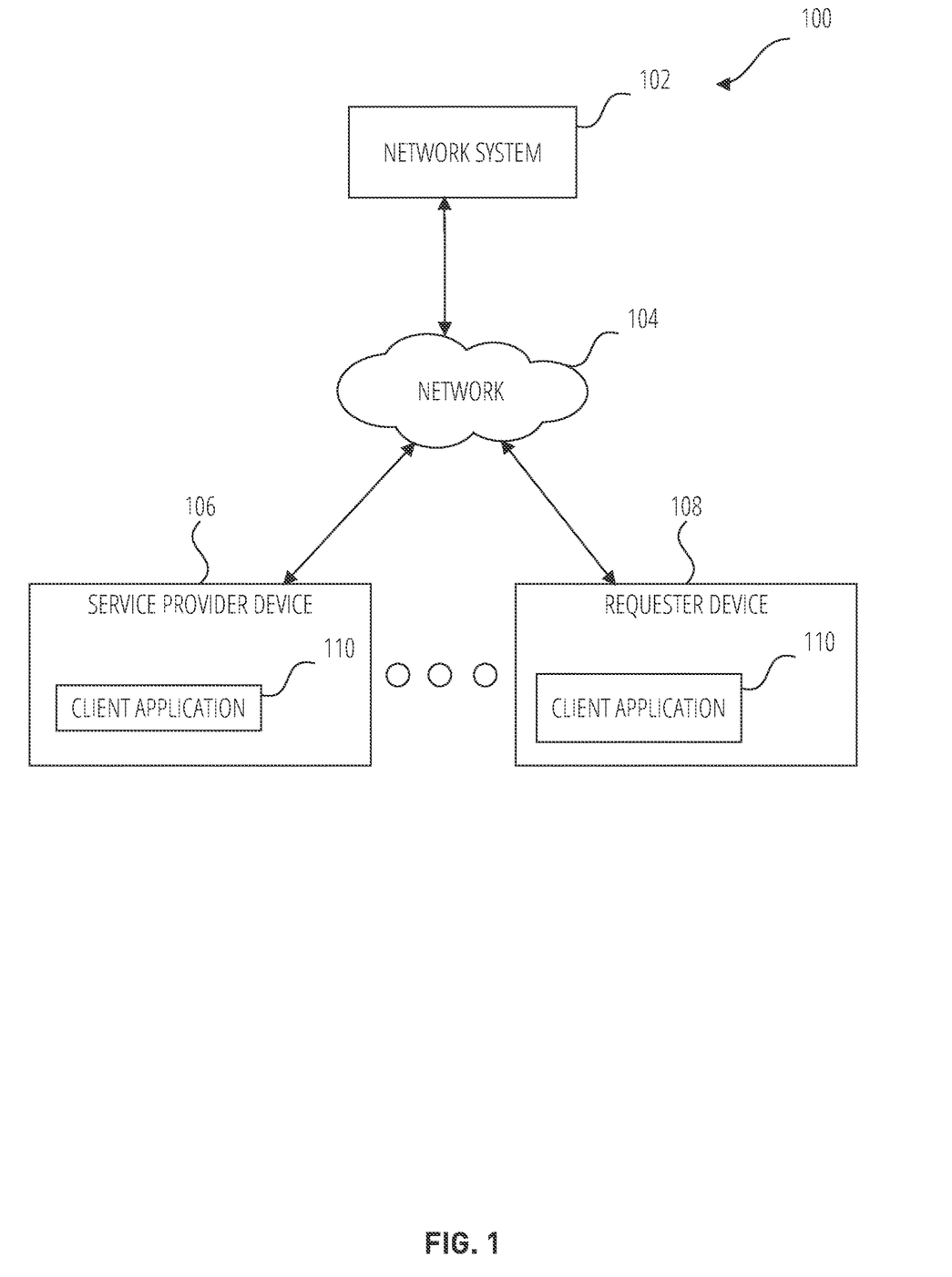
FIG. 1 is a diagram illustrating a network environment 100 suitable for providing accurate and customized search results.

FIG. 1 is a diagram illustrating a network environment 100 suitable for providing accurate and customized search results. The network environment 100 includes a network system 102 communicatively coupled via a network 104 to a service provider device 106 of a driver or service provider and a requester device 108 of a user or requester (e.g., rider). In example embodiments, the network system 102 comprises components that obtain, store, and analyze data received from the service provider device 106 or the requester device 108 in order to generate search results. More particularly, the network system 102 performs a federated search across multiple data sources to generate accurate and customized search results based on various signals received from the service provider device 106 or the requester device 108. The components of the network system 102 are described in more detail in connection with FIG. 2 and may be implemented in a computer system, as described below with respect to FIG. 4.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the service provider device 106 and the requester device 108 are portable electronic devices such as smartphones, tablet devices, wearable computing devices (e.g., smartwatches), or similar devices. Alternatively, the service provider device 106 can correspond to an on-board computing system of a vehicle. The service provider device 106 and the requester device 108 each comprises one or more processors, memory, touch screen displays, wireless networking system (e.g., IEEE 802.11), cellular telephony support (e.g., LTE/GSM/UMTS/CDMA/HSDP A), and/or location determination capabilities.

The service provider device 106 and the requester device 108 interact with the network system 102 through a client application 110 stored thereon. The client application 110 allows for exchange of information with the network system 102 via user interfaces, as well as in background. For example, the client application 110 may determine and/or provide location information of the service provider device 106 and the requester device 108 (e.g., current location in latitude and longitude), barometer readings, or signal strengths (e.g., Wi-Fi and Bluetooth signal strengths) via the network 104, for analysis and storage. In example embodiments, the location information is used by the network system 102 for generating accurate and customized search results, as will be discussed in more details below.

In example embodiments, a first user (e.g., a requester or rider) operates the requester device 108 that executes the client application 110 to communicate with the network system 102 to make a request for a transportation service such as transport or delivery service (referred to collectively as a "trip"). In example embodiments, the client application 110 presents, via user interfaces, the recommendation of one or more generated search results that the first user can select as their destination for the transportation service as part of the request.

A second user (e.g., a service provider or driver) operates the service provider device 106 to execute the client application 110 that communicates with the network system 102 to exchange information associated with providing the transportation service (e.g., to the user of the requester device 108). The client application 110 presents information via user interfaces to the second user of the service provider device 106, such as invitations to provide the transportation service, navigation instructions, and pickup and drop-off locations of people or items to be transported. The client application 110 also provides data to the network system 102 such as a current location (e.g., coordinates such as latitude and longitude), associated with the service provider device 106 or vehicle.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 4, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of client devices (e.g., service provider device 106, requester device 108) may be embodied within the network environment 100. Furthermore, some components or functions of the network environment 100 may be combined or located elsewhere in the network environment 100. For example, some of the functions of the network system 102 may be embodied within other systems or devices of the network environment 100. Additionally, some of the functions of the client devices (e.g., service provider device 106, requester device 108) may be embodied within the network system 102. While only a single network system 102 is shown, alternative embodiments may contemplate having more than one network system 102 to perform server operations discussed herein for the network system 102.

Figure 2:
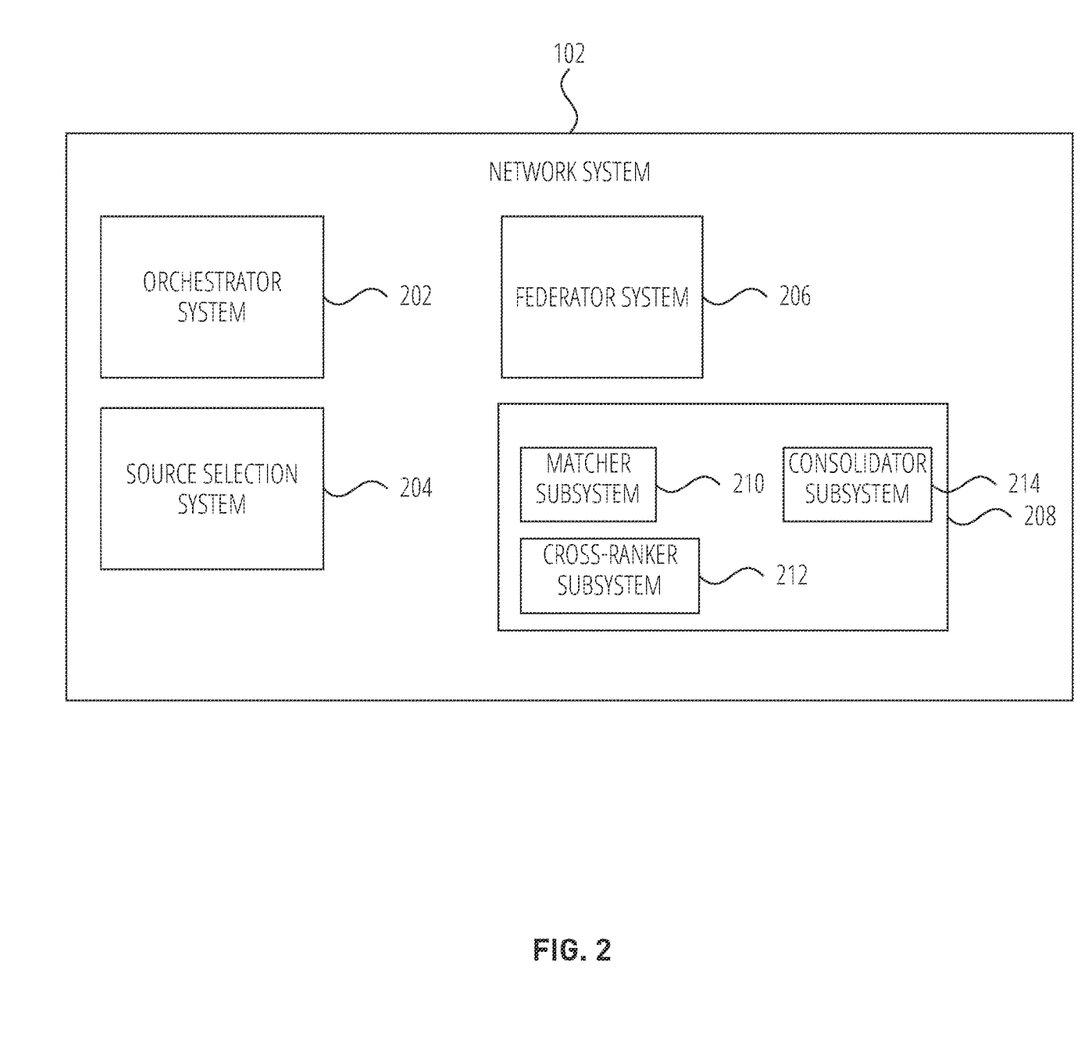
FIG. 2 is a block diagram illustrating components of the network system, according to some example embodiments.

FIG. 2 is a block diagram illustrating components of the network system 102, according to some example embodiments. In various embodiments the network system 102 receives search queries from one or more user devices (e.g., service provider device 106 and requester device 108) and analyzes the search queries to generate accurate and customized search results. During runtime, the network system 102 receives a search query, performs a federated search across multiple data sources and provides a ranked list of search results to a device from which the search query was received from. To enable these operations, the network system 102 comprises an orchestrator system 202, a source selection system 204, a federator system 206 and a 208 all configured to communicate with each other (e.g., via a bus, shared memory, or a switch).

The network system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The orchestrator system 202 determines if the search query meets a threshold criteria to qualify to be run through a federated search protocol. A traditional search is a search of data sources, that is conducted by searching each data source independently. A unified search is a search that provides a single index of content from all data sources. A federated search is a search that submits a search query to multiple search engines, each associated with its own data source, and returns the search results in a unified interface.

In some examples, the threshold criteria is based on the location of the search query (e.g., where the search query is originating from). In some examples, the threshold criteria is based on the content of the search query. The orchestrator system 202 includes a set of rules (e.g., threshold criteria) that the search query is evaluated against before the network system 102 processes the search query using a federated search protocol. If the orchestrator system 202 determines that the search query does not satisfy the threshold criteria, the network system 102 processes the search query using a traditional search or unified search protocol. If the orchestrator system 202 determines that the search query satisfies the threshold criteria, the network system 102 processes the search query according to a federated search protocol. The threshold criteria or set of rules may be preconfigured by a user of the network system 102.

The source selection system 204 provides access to multiple data sources. The source selection system 204 is communicatively coupled to multiple search providers via various application programming interfaces (APIs). Each search provider is associated with a data source. The source selection system 204 further determines a subset of data sources from the multiple data sources to based on aspects of the search query. In one example, the source selection system 204 includes a machine learning model to choose the subset of data sources based on the search query. In some examples the source selection system 204 analyzes the search query using the machine learning model and generates a classification of the search query. For example, the machine learning model is trained to generate the classification of the search query. In some examples, the classification of the search query is a category relating to the search, such as restaurants, airports, gas stations, and so forth. In some examples, the classification of the search query is based on the location of the search query, such as whether the search is originating from a specific city, if the search is being conducted from an urban area or a rural area, and so forth.

Based on the classification of the search query, the source selection system 204 selects a subset of data sources that are best suited for providing accurate search results corresponding to the search query. After selecting the subset of data sources, the source selection system 204 provides the search query to the corresponding search providers of the selected subset of data sources. The source selection system 204 then retrieves a list of search results via the search providers from each data source in the selected subset of data sources.

The federator system 206 extracts features from the search results provided by the source selection system 204. The features of the search results may include metadata associated with the search results such as location data, name, and so forth. The extracted features may be used to generate similarity scores for each of the search results. For example, the federator system 206 may include a machine learning model that analyzes the extracted features of the search results and generates a similarity score for the search result. In some examples, the federator system 206 prunes the list of search results provided by the source selection system 204 before generating similarity scores for the search results. For example, if a search result is associated with location data that is above a threshold distance away from the location data associated with the search query, the federator system 206 may discard that search result.

The blender system 208 matches, cross-ranks and consolidates search results before generating a final list of search results. To this end, the blender system 208 is shown to include a matcher subsystem 210 a cross-ranker subsystem 212, and a consolidator subsystem 214.

The matcher subsystem 210 identifies and clusters together multiple copies of the same result. Given the search results from multiple data sources denoted by $\{R_1, R_2, R_3, \ldots R_{11}\}$ where each $R_i$ is a search result provided by the source selection system 204, the matcher subsystem 210 identifies clusters of search results that represent the same search result. For example, if the input to the matcher subsystem 210 is $\{R_1, R_2, R_3, R_4, R_5\}$ where $R_1$, $R_2$, and $R_3$ are from one data source and $R_4$ and $R_5$ are from another data source, the matcher subsystem 210 may return the following clusters: $\{(R_1, R_4), R_2, (R_3, R_5)\}$ where $R_1$ and $R_4$ are duplicate search results and $R_3$ and $R_5$ are another set of duplicate search results. In some examples, the matcher subsystem 210 identifies matches or duplicates of search results based on location data associated with the search result. The matcher subsystem 210 generates a graph where an edge is defined between location data that match. For example, if the location data of a first search result and the second search result match, then the matcher subsystem 210 creates an edge between the first search result and the second search result. All results in the graph that are connected belong to a same matching cluster. Although the above examples describe identifying matches based on location data of the search results, it is to be understood that the matcher subsystem 210 may match search results based on any one or more aspects of search result metadata.

After the matcher subsystem 210 matches the results (or generates matched clusters), the cross-ranker subsystem 212 ranks the results or the matched clusters. The cross-ranker subsystem 212 takes multiple rankings or top-K ranked results from individual search systems and produces a single aggregated ranking using optimization criteria. For example, the cross-ranker subsystem 212 may generate a single aggregate ranking as shown below:

| Ranked Items from Data Source 1 | Ranked Items from Data Source 2 | Single Aggregate Ranking |
| --- | --- | --- |
| Coffee Shop A | Coffee Shop B | Coffee Shop B |
| Coffee Shop B | Coffee Shop D | Coffee Shop E |
| Coffee Shop C | Coffee Shop E | Coffee Shop A |
|  |  | Coffee Shop B |

The single aggregate ranking may be determined based on multiple methodologies. A first methodology is a consensus-based methodology. In the consensus-based methodology, the cross-ranker subsystem 212 takes into consideration the agreement of search result positions across the rankings, and aims to produce an aggregate ranking that is closer to individual rankings in terms of search result positions. Example consensus-based methodologies include MEDRank, Borda count, and Spearman footrule aggregation. A second methodology is a preference-based methodology. In the preference-based methodology, the aggregated ranking is based on giving preference to one data source over another. For example: Data Source 1 is given preference over Data Source 2, Data Source 2 is given preference over Data Source 1, or the search results for each ranked position are selected by picking alternate results from each data source (e.g., the first result is selected from Data Source 1, the first result is selected from Data source 2, the second result is selected from Data Source 1, etc.). A third methodology is a machine-learning based methodology. Example machine-learning algorithms may include a weighted BordaFuse, Bayesian inference-based probabilistic models, and document and context feature based approaches. For consensus-based and preference-based methodologies, the cross-ranker subsystem 212 extracts positional features from each cluster (e.g., the clusters generated by the matcher subsystem 210). For the machine-learning based approach, the cross-ranker subsystem 212 extracts, for example, the positional features from the clusters, distance of the cluster from the search query, and query specific features. The output of the cross-ranker subsystem 212 is a ranked list of matched clusters and a relevance score for each cluster.

The consolidator subsystem 214 selects only one result from each cluster to resolve duplicates within each cluster. Specifically, the consolidator subsystem 214 returns the top-K results ordered by the relevance score that is determined by the cross-ranker subsystem 212 and picks only one of the results within the same cluster (e.g., via deduplication). The deduplication may occur according to various techniques. In one technique, the consolidator subsystem 214 considers historical data associated with the search result. The historical data may be data stored within the network system 102 (e.g., data associated with transportation trips). In some examples, the consolidator subsystem 214 selects the search results based on a category or classification of the search query. In another example, the consolidator subsystem 214 uses a machine-learning approach that considers various aspects of the search query and the data sources. In another example, the consolidator subsystem 214 selects the search results based on data richness. For example, a search result associated with higher quality data may be more preferable than a search result associated with minimal data.

Figure 3:
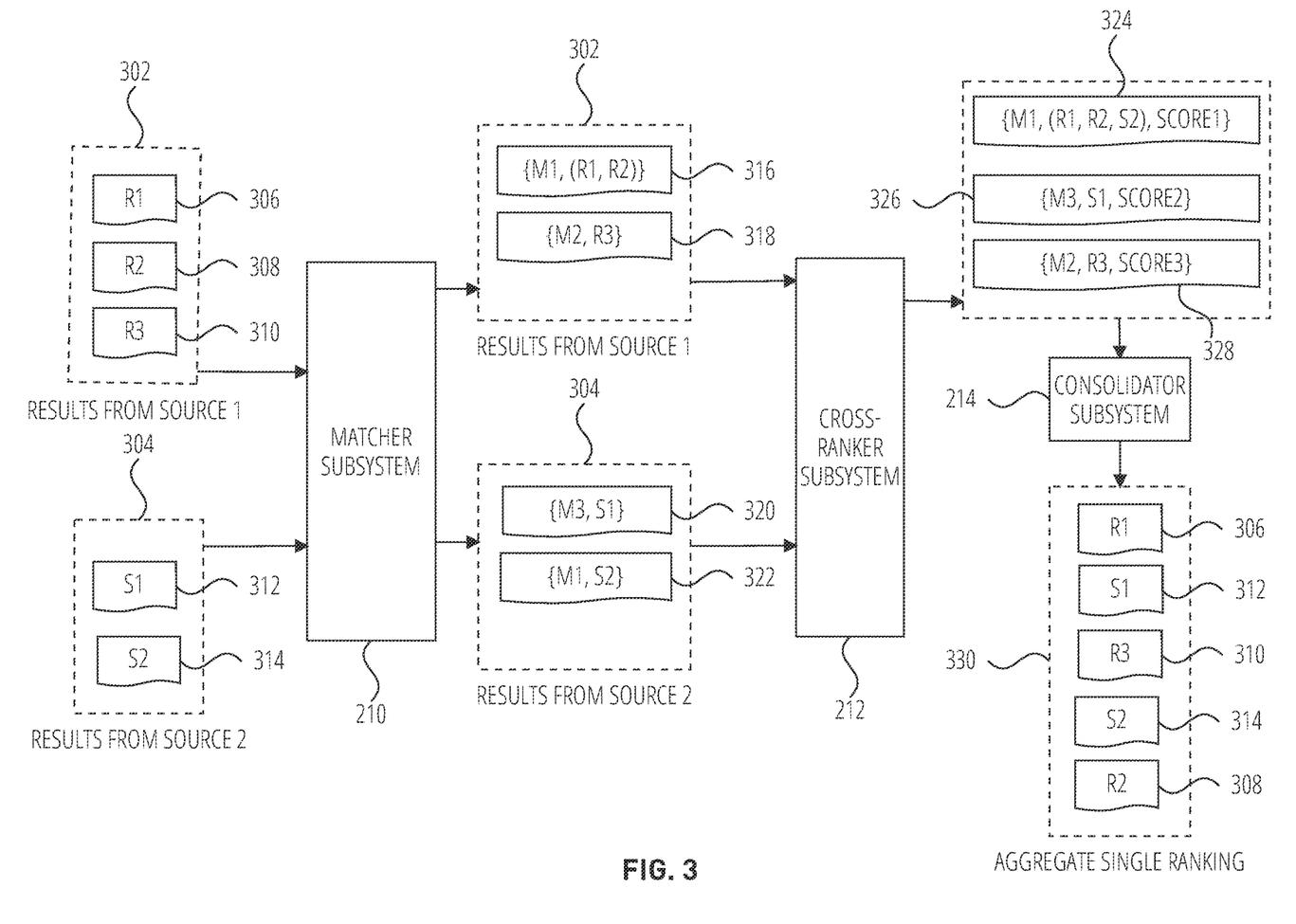
FIG. 3 is an illustration of a process for generating an aggregate single ranking, according to example embodiments.

FIG. 3 is an illustration of a process for generating an aggregate single ranking, according to example embodiments. The network system 102 receives a search query and provides the search query to a set of data sources. The illustration in FIG. 3 is an example matching, ranking and consolidation of search results from a first data source (Source 1) and a second data source (Source 2).

The matcher subsystem 210 receives as input, the results from source 1 302 including search result r1 306, search result r2 308, and search result r3 310 and the results from source 2 304 including search result s1 312 and search result s2 314. The matcher subsystem 210 identifies and clusters together multiple copies of the same result. Thus, the matcher subsystem 210 outputs a first cluster M1 316 that is shown to include search results r1 306 and r2 308 and a second cluster M2 318, that is shown to include search result r3 310. The matcher subsystem 210 further outputs a third cluster M3 320 which is shown to include search result s1 312, and a duplicate cluster M1 322 that is shown to include search result s2 314. The matcher subsystem 210 helps identifies intra-source and inter-source duplicate search results. For example, as shown in FIG. 3, M1 316 and M1 322 are intra-source and inter-source matches respectively identified by the same identification label, "M1." The matcher subsystem 210 maintains the stability of ranked positions within each data source in the matched output. Any non-matching results within the same data source, will remain in the same ranked order. Any intra-source matched items will be clustered together in the same ranked position, at the least ranked position of the matched items. For example, if search result $r_i$ and search result $r_j$ are identified as matched items in the same source, and are ranked at positions i and j respectively, and if i<j, then the match {M, $\{r_i, r_j\}$} will be placed at position i.

The matched clusters are subsequently provided as input to the cross-ranker subsystem 212. The cross-ranker subsystem 212 extracts features from each cluster within each source and generates a ranked list of matched clusters and a relevance score associated with each matched cluster. As shown in FIG. 3, the output of the cross-ranker subsystem 212 is a ranked list comprising: a first item 324 including M1 316 and Score 1, a second item 326 including M3 320 and Score 2, and a third item 328 including M2 318 and Score 3. The output of the cross-ranker subsystem 212 are provided to the consolidator subsystem 214. The consolidator subsystem 214 returns top-K results ordered by the relevance score generated by the cross-ranker subsystem 212. As shown in FIG. 3, the consolidator subsystem 214 generates an aggregate single ranking 330 that is shown to include, in ranked order, search result r1 306, s1 312, r3 310, s2 314, and r2 308.

Figure 4:
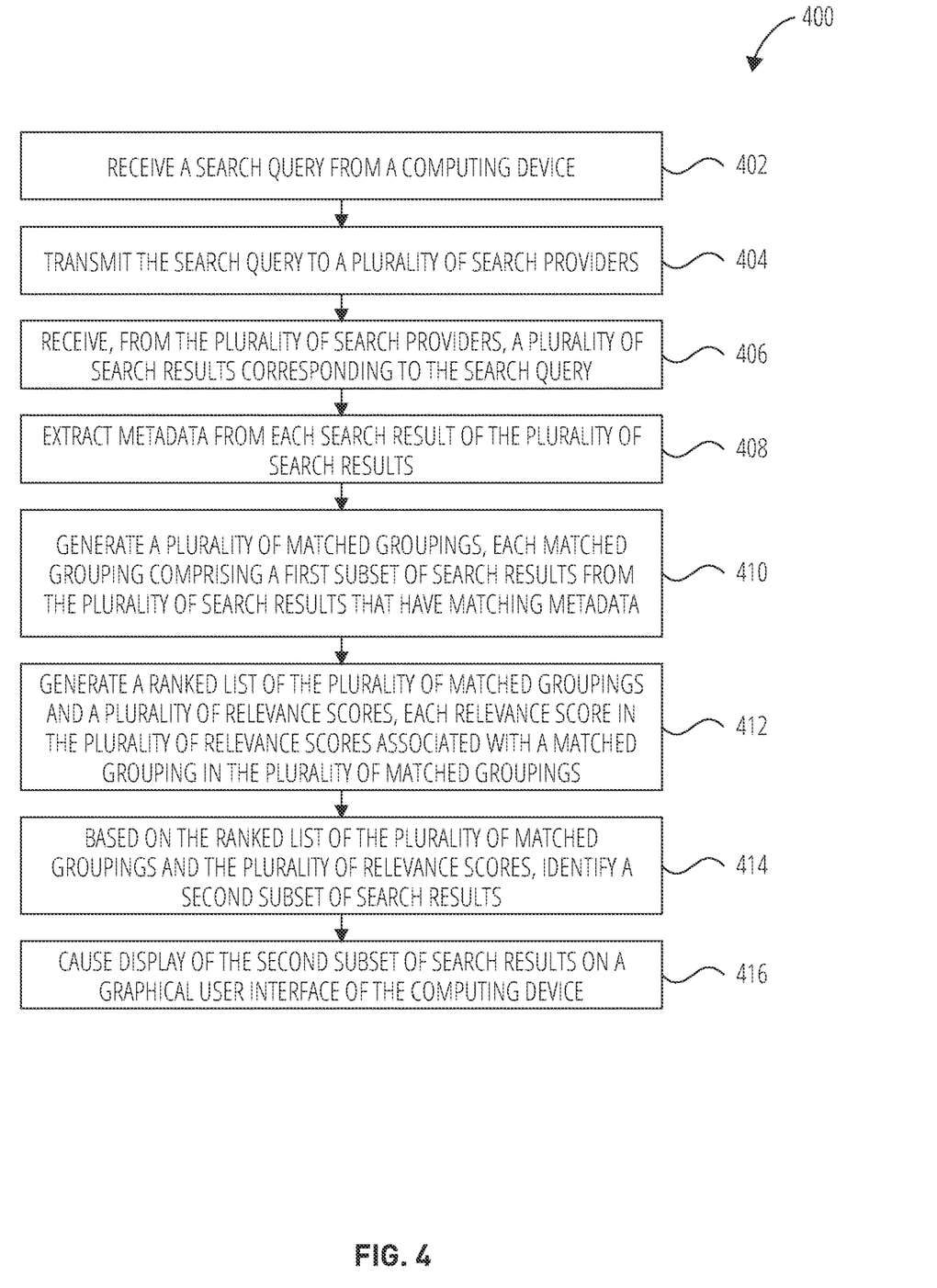
FIG. 4 is flow chart of a method for generating a list of accurate and customized search results using a federated search protocol, according to example embodiments.

FIG. 4 is a flow diagram of a method 400 for generating a list of accurate and customized search results using a federated search protocol, according to example embodiments. Although the described flow diagram can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Operations in the method 400 may be performed by the network system 102, using components described above with respect to FIG. 2. Accordingly, the method 400 is described by way of example with reference to the network system 102. However, it shall be appreciated that at least some of the operations of the method 400 may be deployed on various other hardware configurations or be performed by similar components residing elsewhere in the network environment 100. Therefore, the method 400 is not intended to be limited to the network system 102.

At operation 402, the network system 102 receives, by a processor, a search query from a computing device. The search query may be a search conducted within the client application 110 on a requester device 108 or a service provider device 106.

At operation 404, the network system 102 transmits, by the processor, the search query to a plurality of search providers. At operation 406, the network system 102 receives, from the plurality of search providers, a plurality of search results corresponding to the search query. In some examples, before operation 404, the network system 102 analyzes the search query and generates a classification of the search query. The analysis and classification of the search query may be performed by a first machine-learning model (e.g., a neural network). The network system 102 identifies a subset of search providers that include data that matches the classification of the search query. The network system 102 may transmit the search query to only the subset of search providers that include data that matches the classification of the search query. For example, operations 404-406 may be performed by the source selection system 204. Further details regarding analysis and classification of the search query may be found above in connection with the source selection system 204 in FIG. 2.

At operation 408, the network system 102 extracts metadata from each search result of the plurality of search results. The metadata may include a single data point (e.g., location data) or multiple data points (e.g., location data, name, address, etc.). The metadata may be extracted using a second machine learning model. For example, operation 408 may be performed by the federator system 206. Further details of the federator system 206 are found above in connection with FIG. 2.

At operation 410, the network system 102 generates a plurality of matched groupings. Each matched grouping includes a first subset of search results from the plurality of search results that have matching metadata. The matched groupings may be generated using a third machine learning model. Operation 410 may be performed by the matcher subsystem 210 described above in connection with FIG. 2.

At operation 412, the network system 102 generates a ranked list of the plurality of matched groupings and a plurality of relevance scores. Each relevance score is associated with a matched grouping in the plurality of matched groupings. The ranked list of matched groupings and the plurality of relevance scores may be generated using a fourth machine learning model. Each ranked matched grouping is ranked based on the data source associated with the first subset of search results in each ranked matched grouping. Operation 412 may be performed by the cross-ranker subsystem 212 described above in connection with FIG. 2.

At operation 414, the network system 102 identifies a second subset of search results based on the ranked list of the plurality of matched groupings and the plurality of relevance scores. The second subset of search results may be identified using a fifth machine-learning model. The second subset of search results may be the search results within an aggregate single ranking 330. Operation 414 may be performed by the consolidator subsystem 214. At operation 416, the network system 102 causes display of the second subset of search results on a graphical user interface of a client device.

In some examples, the search query is received as part of a transportation trip request on a ride-share application (e.g., client application 110). A user of the requester device 108 inputs a search query within a user interface of the ride-share application. The network system 102 determines the location of the requester device 108, and based on the determination, the network system 102 (via the orchestrator system 202), determines whether the search query meets the threshold criteria for a federated search. For example, the network system 102 determines that the location is an airport. The threshold criteria for a federated search includes a rule that requires that the location of the requester device 108 is not at an airport. Since the search query does not meet the threshold criteria for a federated search, the search query is analyzed using traditional search systems (not pictured) that are part of the network system 102.

In some examples, the search query is received as part of transportation trip request for a restaurant courier pick-up via the client application 110. A user of the requester device 108 inputs a search query for a pickup location, such as a particular restaurant in San Francisco, California, within a user interface of the client application 110. The network system 102 determines whether the search query meets the threshold criteria for a federated search. For example, the threshold criteria for a federated search may include that the query is based in a qualified city (such as San Francisco) and is not associated with an airport location. The network system 102 determines that the location of the requester device 108 is in San Francisco and that the query is related to a restaurant courier pick-up. Based on the determination, the network system 102 (via the orchestrator system 202), determines that the search query meets the threshold criteria for a federated search.

Figure 5:
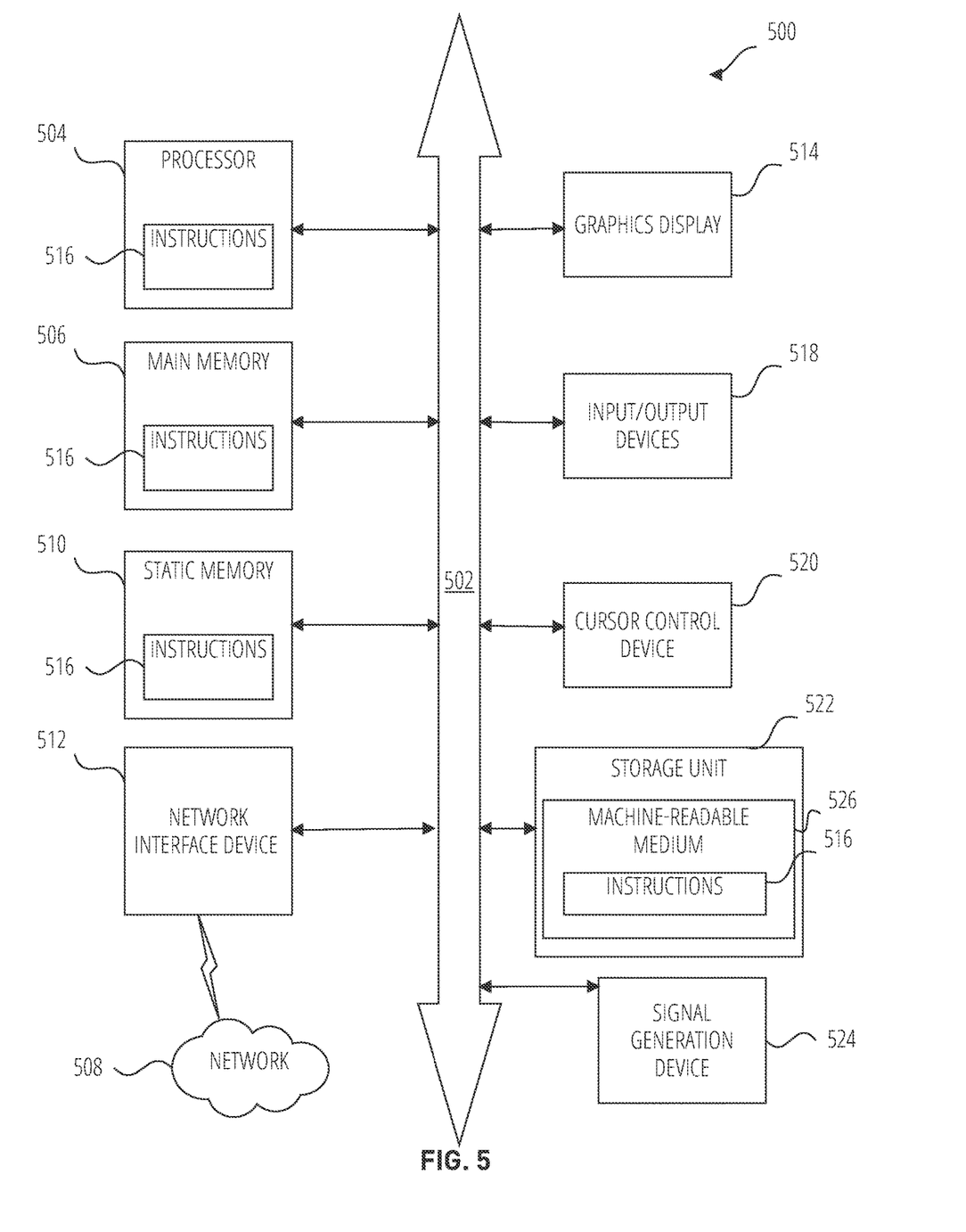
FIG. 5 shows a diagrammatic representation of a machine in the example form of a machine within which a set of instructions, for causing the machine to perform any one or more of the methodologies discussed herein, may be executed.

FIG. 5 shows a diagrammatic representation of a machine in the example form of a machine 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 500 includes a processor 504 (e.g., a central processing unit (CPU) a graphics processing unit (GPU) or both), a main memory 506 and a static memory 510 (with one or more sets of instructions 516) which communicate with each other via a bus 502. The machine 500 may further include a graphics display 514 (e.g., a liquid crystal display (LCD) or a cathode ray tube (CRT)). The machine 500 also includes an alphanumeric input device 518 (e.g., a keyboard), a cursor control device 520 (e.g., a mouse), a disk storage unit 522, a signal generation device 524 (e.g., a speaker) and a network interface device 512.

The disk storage unit 522 includes a non-transitory computer-readable medium (e.g., machine-readable medium 526) on which is stored one or more sets of instructions 516 (e.g., software) embodying any one or more of the methodologies or functions described herein. The instructions 516 may also reside, completely or at least partially, within the main memory 506 and/or within the processor 504 during execution thereof by the computer system, the main memory 506 and the processor 504 also constituting non-transitory computer-readable media.

The instructions 516 may further be transmitted or received over a network 104 via the network interface device 512.

While not illustrated, it is understood that that machine 500 can further include sensors that create data regarding a thermal state of the machine 500, an orientation of the machine 500 and a current location of the machine 500. In various embodiments, the machine 500 includes a temperature sensor, an accelerometer and/or a global position system for identifying the current location of the machine 500.

While the non-transitory computer-readable medium, machine-readable medium 526 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the subject matter described herein. The term "computer-readable medium" shall accordingly be taken to include, but not be limited to, solid-state memories, optical and magnetic media, and carrier wave signals.

Thus, a method(s) and system(s) to detect a thermal state(s) and position(s) of a computing device are disclosed herein in accordance with various embodiments. Although the subject matter herein has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, by a processor, a search query from a computing device;
   transmitting, by the processor, the search query to a plurality of search providers;
   receiving, from the plurality of search providers, a plurality of search results corresponding to the search query;
   extracting metadata from each search result of the plurality of search results;

generating a plurality of matched groupings, each matched grouping comprising a first subset of search results from the plurality of search results that have matching metadata;

generating a ranked list of the plurality of matched groupings and a plurality of relevance scores, each relevance score in the plurality of relevance scores associated with a matched grouping in the plurality of matched groupings;

based on the ranked list of the plurality of matched groupings and the plurality of relevance scores, identifying a second subset of search results; and causing display of the second subset of search results on a graphical user interface of the computing device.

2. The method of claim 1, wherein transmitting the search query to the plurality of search providers further comprises:

analyzing the search query using a first machine learning model trained to generate a classification of the search query;

identifying a subset of search providers from the plurality of search providers, the subset of search providers comprising data that matches the classification of the search query; and transmitting the search query to the subset of search providers.

3. The method of claim 2, wherein identifying the subset of search providers further comprises:

identifying location data associated with the search query; and identifying the subset of search providers that comprises data associated with the location data.

4. The method of claim 1, wherein the metadata from each search result is extracted using a second machine learning model.

5. The method of claim 1, wherein the plurality of matched groupings are generated using a third machine learning model.

6. The method of claim 1, wherein the ranked list of the plurality of matched groupings and the plurality of relevance scores are generated using a fourth machine learning model.

7. The method of claim 1, wherein the second subset of search results are identified using a fifth machine learning model.

8. The method of claim 1, wherein each search provider is associated with a data source.

9. The method of claim 8, wherein each ranked matched grouping of the plurality of matched groupings is ranked based on the data source associated with the first subset of search results in each ranked matched grouping.

10. The method of claim 1, wherein the second subset of search results is identified based on being a top-K subset of results from the plurality of search results, wherein the top-K subset of results is ordered based on the plurality of relevance scores.

11. A computing system comprising:
a processor; and
a memory storing instructions that, when executed by the processor, configure the system to perform operations comprising:
receiving a search query from a computing device;
transmitting the search query to a plurality of search providers;
receiving, from the plurality of search providers, a plurality of search results corresponding to the search query;
extracting metadata from each search result of the plurality of search results;

generating a plurality of matched groupings, each matched grouping comprising a first subset of search results from the plurality of search results that have matching metadata;

generating a ranked list of the plurality of matched groupings and a plurality of relevance scores, each relevance score in the plurality of relevance scores associated with a matched grouping in the plurality of matched groupings;

based on the ranked list of the plurality of matched groupings and the plurality of relevance scores, identifying a second subset of search results; and causing display of the second subset of search results on a graphical user interface of the computing device.

12. The computing system of claim 10, wherein transmitting the search query to the plurality of search providers further comprises:

analyzing the search query using a first machine learning model trained to generate a classification of the search query;

identifying a subset of search providers from the plurality of search providers, the subset of search providers comprising data that matches the classification of the search query; and transmitting the search query to the subset of search providers.

13. The computing system of claim 11, wherein identifying the subset of search providers further comprises:

identifying location data associated with the search query; and identifying the subset of search providers that comprises data associated with the location data.

14. The computing system of claim 10, wherein the metadata from each search result is extracted use a second machine learning model.

15. The computing system of claim 10, wherein the plurality of matched groupings are generated use a third machine learning model.

16. The computing system of claim 10, wherein the ranked list of the plurality of matched groupings and the plurality of relevance scores are generated use a fourth machine learning model.

17. The computing system of claim 10, wherein the second subset of search results are identified use a fifth machine learning model.

18. The computing system of claim 10, wherein each search provider is associated with a data source.

19. The computing system of claim 17, wherein each ranked matched grouping of the plurality of matched groupings is ranked based on the data source associated with the first subset of search results in each ranked matched grouping.

20. A non-transitory computer-readable storage medium, the computer-readable storage medium including instructions that when executed by a computer, cause the computer to:

receiving a search query from a computing device;
transmitting the search query to a plurality of search providers;
receiving, from the plurality of search providers, a plurality of search results corresponding to the search query;
extracting metadata from each search result of the plurality of search results;

generating a plurality of matched groupings, each matched grouping comprising a first subset of search results from the plurality of search results that have matching metadata;

generating a ranked list of the plurality of matched groupings and a plurality of relevance scores, each relevance score in the plurality of relevance scores associated with a matched grouping in the plurality of matched groupings;

based on the ranked list of the plurality of matched groupings and the plurality of relevance scores, identifying a second subset of search results; and causing display of the second subset of search results on a graphical user interface of the computing device.

\* \* \* \* \*